(12) United States Patent
Bachman et al.

(10) Patent No.: US 10,095,472 B2
(45) Date of Patent: *Oct. 9, 2018

(54) DIGITAL MEDIA ASSET BROWSING WITH AUDIO CUES

(71) Applicant: Apple Inc., Cupertino, CA (US)

(72) Inventors: William M. Bachman, San Jose, CA (US); Timothy Wasko, Alberta (CA); Christopher Sanders, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/929,065

(22) Filed: Oct. 30, 2015

(65) Prior Publication Data

US 2016/0054978 A1 Feb. 25, 2016

Related U.S. Application Data

(63) Continuation of application No. 12/554,946, filed on Sep. 7, 2009, now Pat. No. 9,176,962.

(51) Int. Cl.
| | |
|---|---|
| *G06F 3/048* | (2013.01) |
| *G06F 3/16* | (2006.01) |
| *G06F 17/30* | (2006.01) |
| *G06F 3/0482* | (2013.01) |
| *G06F 3/0484* | (2013.01) |

(52) U.S. Cl.
CPC ............ *G06F 3/167* (2013.01); *G06F 3/0482* (2013.01); *G06F 3/04842* (2013.01); *G06F 17/30058* (2013.01)

(58) Field of Classification Search
None
See application file for complete search history.

(56) References Cited

U.S. PATENT DOCUMENTS

| | | |
|---|---|---|
| 5,303,388 A | 4/1994 | Kreitman et al. |
| 5,345,543 A | 9/1994 | Capps et al. |
| 5,396,590 A | 3/1995 | Kreegar |
| 5,452,414 A | 9/1995 | Rosendahl et al. |

(Continued)

FOREIGN PATENT DOCUMENTS

| | | |
|---|---|---|
| EP | 1 148 412 A2 | 10/2001 |
| EP | 1 677 497 A1 | 7/2006 |

(Continued)

OTHER PUBLICATIONS

"CoverFlow," www.steelskies.com/coverflow/, downloaded Jun. 15, 2006, 2 pages.

(Continued)

*Primary Examiner* — Mahelet Shiberou
(74) *Attorney, Agent, or Firm* — Morgan, Lewis & Bockius LLP

(57) ABSTRACT

Methods, systems and apparatus for image-based browsing through a plurality of digital media assets assisted by media cues are disclosed. The media cues can be provided by playback of short audio segments, referred to as snippets, of the digital media assets being browsed. The digital media assets can be grouped into collections of digital media assets. In one embodiment, as a user browses through digital media assets using visual representations of the collections of digital media assets, media cues can be provided.

21 Claims, 11 Drawing Sheets

(56) References Cited

U.S. PATENT DOCUMENTS

| | | | |
|---|---|---|---|
| 5,463,725 A | 10/1995 | Henckel et al. | |
| 5,838,326 A | 11/1998 | Card et al. | |
| 5,864,868 A | 1/1999 | Contois | |
| 5,880,733 A | 3/1999 | Horvitz et al. | |
| 5,995,101 A | 11/1999 | Clark et al. | |
| 6,006,227 A | 12/1999 | Freeman et al. | |
| 6,023,275 A | 2/2000 | Horvitz et al. | |
| 6,346,951 B1 | 2/2002 | Mastronardi | |
| 6,466,237 B1 | 10/2002 | Miyao et al. | |
| 6,486,895 B1 | 11/2002 | Robertson et al. | |
| 6,489,951 B1 | 12/2002 | Wong et al. | |
| 6,577,330 B1 | 6/2003 | Tsuda et al. | |
| 6,638,313 B1 | 10/2003 | Freeman et al. | |
| 6,667,751 B1 | 12/2003 | Wynn et al. | |
| 6,725,427 B2 | 4/2004 | Freeman et al. | |
| 6,768,999 B2 | 7/2004 | Prager et al. | |
| 6,975,306 B2 | 12/2005 | Hinckley et al. | |
| 7,085,590 B2 | 8/2006 | Kennedy et al. | |
| 7,479,949 B2 | 1/2009 | Jobs et al. | |
| 7,492,350 B2 | 2/2009 | Fabre et al. | |
| 7,581,186 B2 | 8/2009 | Dowdy et al. | |
| 7,656,393 B2 | 2/2010 | King et al. | |
| 7,710,393 B2 | 5/2010 | Tsuk et al. | |
| 7,818,691 B2 | 10/2010 | Irvine | |
| 7,877,687 B2 | 1/2011 | Blinnikka et al. | |
| 7,966,638 B2 * | 6/2011 | Gossweiler, III | H04N 21/235 725/133 |
| 7,996,792 B2 | 8/2011 | Anzures et al. | |
| 8,296,656 B2 | 10/2012 | Dowdy et al. | |
| 8,365,235 B2 * | 1/2013 | Hunt | G06F 3/04817 709/219 |
| 8,600,529 B2 | 12/2013 | Shafer et al. | |
| 2001/0015719 A1 | 8/2001 | Van Ee et al. | |
| 2001/0030660 A1 | 10/2001 | Zainoulline | |
| 2001/0050687 A1 | 12/2001 | Iida et al. | |
| 2002/0030699 A1 | 3/2002 | Van Ee | |
| 2002/0113824 A1 | 8/2002 | Myers, Jr. | |
| 2002/0198909 A1 | 12/2002 | Huynh et al. | |
| 2003/0090504 A1 | 5/2003 | Brook et al. | |
| 2003/0122787 A1 | 7/2003 | Zimmerman et al. | |
| 2004/0013416 A1 | 1/2004 | Mok | |
| 2004/0095371 A1 | 5/2004 | Haynes et al. | |
| 2004/0100479 A1 | 5/2004 | Nakano et al. | |
| 2004/0119757 A1 | 6/2004 | Corley et al. | |
| 2004/0122683 A1 | 6/2004 | Grossman et al. | |
| 2004/0123320 A1 | 6/2004 | Daily et al. | |
| 2004/0125088 A1 | 7/2004 | Zimmerman et al. | |
| 2004/0189690 A1 | 9/2004 | Poslinski et al. | |
| 2004/0199582 A1 | 10/2004 | Kucharewski et al. | |
| 2004/0235520 A1 | 11/2004 | Cadiz et al. | |
| 2005/0012723 A1 | 1/2005 | Pallakoff | |
| 2005/0024341 A1 | 2/2005 | Gillespie et al. | |
| 2005/0091596 A1 | 4/2005 | Anthony et al. | |
| 2005/0110768 A1 | 5/2005 | Marriott et al. | |
| 2005/0114778 A1 | 5/2005 | Branson et al. | |
| 2005/0114800 A1 | 5/2005 | Rao | |
| 2006/0026535 A1 | 2/2006 | Hotelling et al. | |
| 2006/0195790 A1 | 8/2006 | Beaupre et al. | |
| 2006/0247980 A1 * | 11/2006 | Mirrashidi | G06Q 10/107 705/26.62 |
| 2007/0033295 A1 | 2/2007 | Marriott | |
| 2007/0044036 A1 | 2/2007 | Ishimura et al. | |
| 2007/0053268 A1 | 3/2007 | Crandall et al. | |
| 2007/0070066 A1 | 3/2007 | Bakhash | |
| 2007/0085841 A1 | 4/2007 | Tsuk et al. | |
| 2007/0124680 A1 | 5/2007 | Robbin et al. | |
| 2007/0136750 A1 | 6/2007 | Abanami et al. | |
| 2007/0168413 A1 | 7/2007 | Barletta et al. | |
| 2007/0260994 A1 | 11/2007 | Sciammarella et al. | |
| 2008/0036743 A1 | 2/2008 | Westerman et al. | |
| 2008/0062141 A1 | 3/2008 | Chaudhri | |
| 2008/0066016 A1 | 3/2008 | Dowdy et al. | |
| 2008/0066135 A1 | 3/2008 | Brodersen et al. | |
| 2008/0086687 A1 | 4/2008 | Sakai et al. | |
| 2008/0086688 A1 | 4/2008 | Chandratillake et al. | |
| 2008/0120291 A1 | 5/2008 | Delgo et al. | |
| 2008/0122796 A1 | 5/2008 | Jobs et al. | |
| 2008/0155458 A1 | 6/2008 | Fagans et al. | |
| 2008/0168403 A1 | 7/2008 | Westerman et al. | |
| 2008/0288867 A1 | 11/2008 | Jeong et al. | |
| 2008/0313570 A1 | 12/2008 | Shamma et al. | |
| 2009/0002335 A1 | 1/2009 | Chaudhri | |
| 2009/0019398 A1 | 1/2009 | Hansson et al. | |
| 2009/0030991 A1 | 1/2009 | Vakkalanka | |
| 2009/0049383 A1 | 2/2009 | Haynes et al. | |
| 2009/0049385 A1 | 2/2009 | Blinnikka et al. | |
| 2009/0049979 A1 | 2/2009 | Naik et al. | |
| 2009/0100093 A1 | 4/2009 | Makipaa | |
| 2009/0150784 A1 | 6/2009 | Denney et al. | |
| 2009/0158201 A1 | 6/2009 | Iampietro et al. | |
| 2009/0158326 A1 * | 6/2009 | Hunt | G06F 3/04817 725/38 |
| 2009/0172532 A1 | 7/2009 | Chaudhri | |
| 2009/0174677 A1 | 7/2009 | Gehani et al. | |
| 2009/0198359 A1 | 8/2009 | Chaudhri | |
| 2009/0228919 A1 | 9/2009 | Zott et al. | |
| 2010/0070523 A1 | 3/2010 | Delgo et al. | |
| 2010/0325549 A1 * | 12/2010 | Gibson | G06F 17/3089 715/733 |
| 2011/0282745 A1 | 11/2011 | Meoded et al. | |

FOREIGN PATENT DOCUMENTS

| | | | |
|---|---|---|---|
| JP | 2000-105772 A | 4/2000 | |
| JP | 2003-330586 A | 11/2003 | |
| WO | WO 01/79980 A1 | 10/2001 | |
| WO | WO 2006/013485 A2 | 2/2006 | |
| WO | WO 2006/020305 A2 | 2/2006 | |
| WO | WO 2008/030779 A2 | 3/2008 | |
| WO | WO 2008/030976 A2 | 3/2008 | |

OTHER PUBLICATIONS

"CoverFlow—Download," www.steelskies.com/coverlfow/download.php, down loaded Jun. 15, 2006, 4 pages.

"CoverFlow—FAQ & Tips," www.steelskies.com/coverlfow/faq.php, downloaded Jun. 15, 2006, 3 pages.

"CoverFlow—Features," www.steelskies.com/coverflow/features.php, downloaded Jun. 15, 2006, 1 page.

Damm et al., "Multimodal Presentation and Browsing of Music," ICM '08, Oct. 20-22, 2008, Chania, Crete, Greece, 4 pages.

Enright, "Dissatisfaction Sows Innovation," The Treehouse + The Cave, Dec. 29, 2004, 4 pages.

Enright, "Dissatisfaction Sows Innovation—Visual Browsing in iTunes," Internet Blow of Andrew Coulter Enright, Dec. 29, 2004, 6 pages.

Enright, "Meet CoverFlow," The Treehouse + The Cave, Aug. 13, 2005, 2 pages.

Enright, "Visual Browsing on an iBook DS," The Treehouse + The Cave, Dec. 29, 2004, 1 page.

Hinze, "CoverFlow—A Beautiful Way to Browse Your MP3s," Noise Magazine Blog, Feb. 5, 2006 2 pages.

"Mechanism for Visual Lists and Selections," IBM Technical Disclosure Bulletin IBM, vol. 40, No. 5, May 1, 1997, 2 pages.

Rose, "Music in the Home: Interfaces for Music Applications," Personal Technologies, v. 4, No. 1, Mar. 2000, 9 pages.

Sawyer, "Get with the CoverFlow," The Olive Press, Dec. 8, 2005, 1 page.

Website prinout, www.steelskies.com, downloaded Jun. 15, 2006, 4 pages.

Wikipedia, "Image Map," http://wayback.archive.org/web/20071021151336/http://en.,wikipedia.org/wiki/Image_map, Oct. 21, 2007, 3 pages.

Office Action, dated Feb. 17, 2012, received in U.S. Appl. No. 12/544,946, 31 pages.

Final Office Action, dated Jul. 6, 2012, received in U.S. Appl. No. 12/544,946, 39 pages.

Office Action, dated Aug. 15, 2013, received in U.S. Appl. No. 12/544,946, 36 pages.

(56) References Cited

OTHER PUBLICATIONS

Final Office Action, dated Jan. 2, 2014, received in U.S. Appl. No. 12/544,946, 39 pages.
Office Action, dated Jul. 11, 2014, received in U.S. Appl. No. 12/544,946, 15 pages.
Final Office Action, dated Nov. 4, 2014, received in U.S. Appl. No. 12/544,946, 16 pages.
Notice of Allowance, dated Jul. 1, 2015, received in U.S. Appl. No. 12/544,946, 12 pages.

* cited by examiner

DIGITAL MEDIA ASSET BROWSING WITH AUDIO CUES

RELATED APPLICATIONS

This application is a continuation of U.S. application Ser. No. 12/554,946, filed Sep. 7, 2009, which is hereby incorporated by reference in its entirety.

BACKGROUND OF INVENTION

Field of Invention

The present invention relates to browsing digital media assets on a display device and, more particularly, to browsing digital media assets with assistance of audio cues.

Description of the Related Art

Personal computers supporting multimedia usage typically operate media management programs for managing various digital media assets, such as music files and video files. Media management programs typically utilize a graphical user interface that allows a user to play, sort, modify, store and catalog their media. Conventionally, graphical user interfaces have a text-based browse window that allow a user to browse through and select a particular media track for playback. More recently, graphical user interfaces have been able to provide an image-based browse environment in which a user can browse images (e.g., cover art) that pertain to corresponding digital media assets. The media management programs may also be linked with an online media store so that new media can be purchased and transferred to the personal computer and subsequently managed by the media management program. One example of a media management program is iTunes™ manufactured by Apple Inc. of Cupertino, Calif., and one example of an online media store is iTunes Store™.

Today, media playback devices, such as media players, have storage capacity to store large collections of media, such as songs (music). With such large media collections, in order for a user to select a particular song to be played by the media player, the user typically navigates through a long list of songs. As an example, the user could interact with the media player to display a list of artists that have songs that are stored within the media collection on the media player. The user then scrolls through the list and selects an appropriate song to be played. Unfortunately, however, as the storage capacity of a media player increases, the number of songs stored in a media collection on the media player also increases. Consequently, the list through which users must navigate in order to select a song can be extensive.

Therefore, there remains a need for improved techniques for browsing digital media assets.

SUMMARY

The invention pertains to methods, systems and apparatus for image-based browsing through a plurality of digital media assets assisted by media cues. The media cues can be provided by playback of short segments, referred to as snippets, of the digital media assets being browsed.

In one embodiment, as a user browses through the digital media assets using visual representations of collections of digital media assets that are displayed for the user, media cues can be provided. For example, the user can cause a pointing action with respect to the visual representation, and the proximity of the pointing action can be used to determine which one or more media cues are to be provided. The media cues can be provided by playback of short segments the one of more of the digital media assets of a collection. Characteristics of the pointing action and/or position of the pointing action with respect to a given visual representation can influence the media cues provided and also how it is played back.

The digital media assets (i.e., digital media items) can pertain to video items (e.g., video files or movies), audio items (e.g., audio files or audio tracks, such as for songs (music) or audiobooks), or image items (e.g., photos).

The invention can be implemented in numerous ways, including as a method, system, device, apparatus (including computer readable medium and graphical user interface). Several embodiments of the invention are discussed below.

As a method for browsing digital media assets, one embodiment can, for example, include at least: displaying a plurality of images having associated active regions on a display screen of a client computer, each of the images being associated with and representing one or more of the digital media assets; detecting a user pointing input at one of the active regions; identifying one or more digital media assets associated with the one of the active regions where the user pointing device is at; and initiating playback of a media snippet of the one or more identified digital media assets if the detecting detects that the user pointing device is at the one of the active regions.

As a computer-implemented method for review media items, one embodiment can, for example, include at least: displaying a representation of at least one collection of media items; receiving a user input movement over the representation of the at least one collection of media items; and playing a short segment of media content pertaining to at least one of the media items in the collection of media items in response to the user input movement over the representation of the at least one collection of media items.

As an apparatus for browsing and playing digital media assets, one embodiment can, for example, include at least: a storage device for storing a plurality of digital media assets; a display device for displaying visual representations pertaining to the digital media assets; and a controller operatively connected to the storage device and the display device. The controller can be configured to at least (i) display a plurality of visual representations, each of the visual representing being associated with and representing one or more of the digital media assets stored in the storage device; (ii) detect a user pointing input at a particular one of the visual representation; (iii) identify one or more digital media assets associated with the particular one of the visual representations; and (iv) initiate playback of a media snippet of the one or more identified digital media assets if the user pointing device is detected at the particular one of the visual representations.

As a computer readable storage medium including at least executable computer program code stored thereon for browsing digital media assets, one embodiment can, for example, include at least: computer program code for displaying a plurality of images having associated active regions on a display screen of a client computer, each of the images being associated with and representing one or more of the digital media assets; computer program code for detecting a user pointing input at one of the active regions; computer program code for identifying one or more digital media assets associated with the one of the active regions where the user pointing device is at; and computer program code for initiating playback of a media snippet of the one or more identified digital media assets if the user pointing device is detected to be at the one of the active regions.

As a computer-implemented method for review media items, one embodiment can, for example, include at least: computer program code for displaying a representation of at least one collection of media items; computer program code for receiving a user input movement over the representation of the at least one collection of media items; and computer program code for playing a short segment of media content pertaining to at least one of the media items in the collection of media items in response to the user input movement over the representation of the at least one collection of media items.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF EMBODIMENTS OF THE INVENTION

The invention pertains to methods, systems and apparatus for image-based browsing through a plurality of digital media assets assisted by media cues. The media cues can be provided by playback of short segments, referred to as snippets, of the digital media assets being browsed.

In one embodiment, as a user browses through the digital media assets using visual representations of collections of digital media assets that are displayed for the user, media cues can be provided. For example, the user can cause a pointing action with respect to the visual representation, and the proximity of the pointing action can be used to determine which one or more media cues are to be provided. The media cues can be provided by playback of short segments the one of more of the digital media assets of a collection. Characteristics of the pointing action and/or position of the pointing action with respect to a given visual representation can influence the media cues provided and also how it is played back.

The image-based browsing of digital media assets assisted by media cues can, according to one embodiment, be performed on an electronic device, such as a computing device, that that supports a display device as well as an audio output device. The computing device can, for example, be a personal computer (e.g., desktop computer, notebook computer or netbook computer), or a handheld portable electronic device.

The digital media assets (i.e., digital media items) can pertain to video items (e.g., video files or movies), audio items (e.g., audio files or audio tracks, such as for songs (music), podcasts or audiobooks), image items (e.g., photos), or any combination thereof.

Embodiments of various aspects of the invention are discussed below with reference to FIGS. 1-8. However, those skilled in the art will readily appreciate that the detailed description given herein with respect to these figures is for explanatory purposes as the invention extends beyond these limited embodiments.

Figure 1:
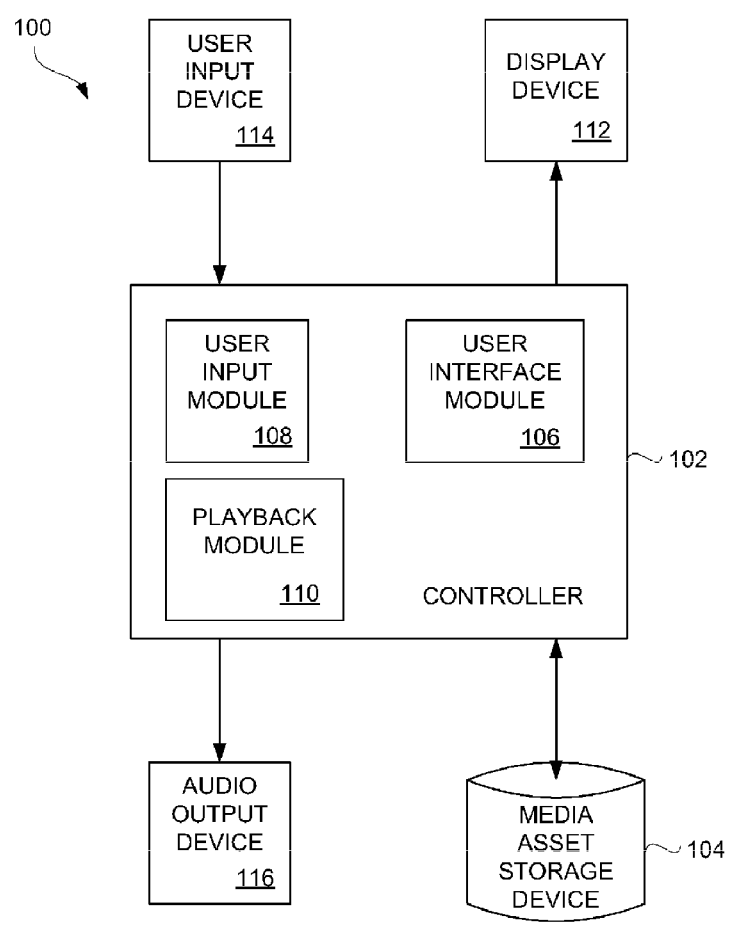
FIG. 1 is a block diagram of the browsing apparatus according to one embodiment of the invention.

FIG. 1 is a block diagram of the browsing apparatus 100 according to one embodiment of the invention. The browsing apparatus 100 includes a controller 102 that operates to control the operation of the browsing apparatus 100. The browsing apparatus 100 operates to assist a user in browsing through a plurality of digital media assets. The digital media assets being browsed can be stored in a media asset storage device 104.

The controller 102 can include one or more specialized modules that can be implemented in hardware or software. As illustrated in FIG. 1, the controller 102 can include or have access to a user interface module 106, a user input module 108 and a playback module 110. The user interface module 106 can communicate with a display apparatus 112 to present a graphical user interface having text and/or graphics pertaining to the plurality of digital media assets that the user of the browsing apparatus 100 can browse. According to one embodiment, the user interface module 106 of the controller 102 controls the display device 112 to display representations of one or more collections of digital media assets. The user, through use of a user input device 114, can provide input to the controller 102. For example, the user input device 114 can provide user input to the user input module 108. The user input can then be utilized to highlight, select or initiate playback of at least one of the digital media assets being presented on the display device 112. In the event that the user input provided by the user input device 114 requests playback of one or more of the digital media assets, the playback module 110 can be utilized to control an audio output device 116 so that audio sound pertaining to the one or more of the digital media assets can be produced by the browsing apparatus 100.

In one embodiment, the browsing apparatus 100 can pertain to a computing device. The computing device can, for example, be a personal computer, such as a desktop computer, notebook computer or netbook computer. The computing device can also be a handheld portable electronic device that supports a display device as well as an audio output device. The audio output device 116 for the browsing apparatus 100 can, for example, be a speaker or an audio output connector. One or more headsets, earbuds or earphones can be connected to the audio output connector.

The user input device 114 can provide a pointing action by the user. The pointing action can be provided by a cursor controlled by a mouse, trackball, touch pad, etc. The pointing action can also be provided by a user touch input with respect to a touch-sensitive surface, which may or may not be integrated with the display device 112.

Figure 2:
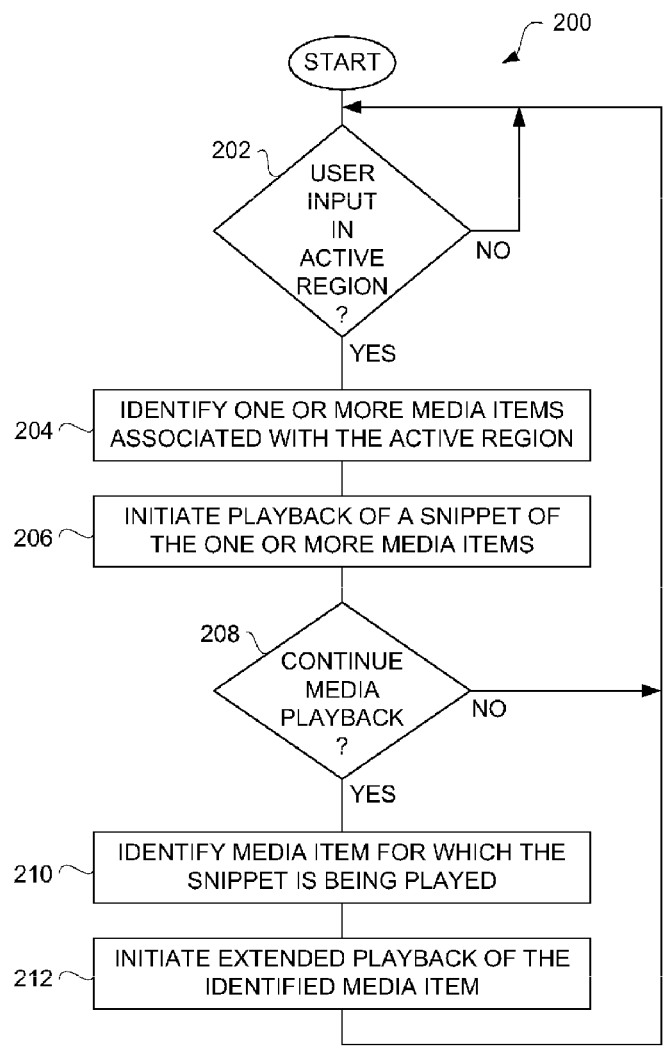
FIG. 2 illustrates a flow diagram of a browse process according to one embodiment of the invention.

FIG. 2 illustrates a flow diagram of a browse process 200 according to one embodiment of the invention. The browse process 200 can, for example, be performed by an electronic device having audio feedback capability. The browse process 200 can assist a user with browsing media items. The electronic device can, for example, be a computing device. For example, the electronic device can implemented by the browsing apparatus 100 illustrated in FIG. 1.

The browse process 200 can begin with a decision 202 that determines whether a user input has been received with respect to an active region. Here, it is assumed that representations for a plurality of different media items (or collections of media items) are presented on a display device. Each of the representations has one or more active regions associated therewith. The decision 202 determines whether a user input, such as a user pointing input, has been received with respect to an active region. When the decision 202 determines that a user input with respect to an active region has not been received, the browse process 200 awaits such a user input. Alternatively, when the decision 202 determines that a user input with respect to an active region as being received, one or more media items associated with the active region can be identified 204. Next, playback of a snippet (i.e., short segment) of the one or more media items can be initiated 206.

A decision 208 can then determine whether media playback of the one or more media items that have been initiated 206 should continue. When the decision 208 determines that the media playback of the one or more media items are not to be continued, the browse process 200 can return to repeat the decision 202 and subsequent blocks so that additional user inputs can be processed to activate playback of other snippets. Alternatively, when the decision 208 determines that the media playback of the one or more media items is to be continued, the media items for which the snippet is being play can be identified 210. Extended playback of the identified media items can then be initiated 212. Following the block 212, the browse process 200 can return to repeat the decision 202 and subsequent blocks so that additional user inputs can be processed to activate playback of other snippets.

Figure 3A:
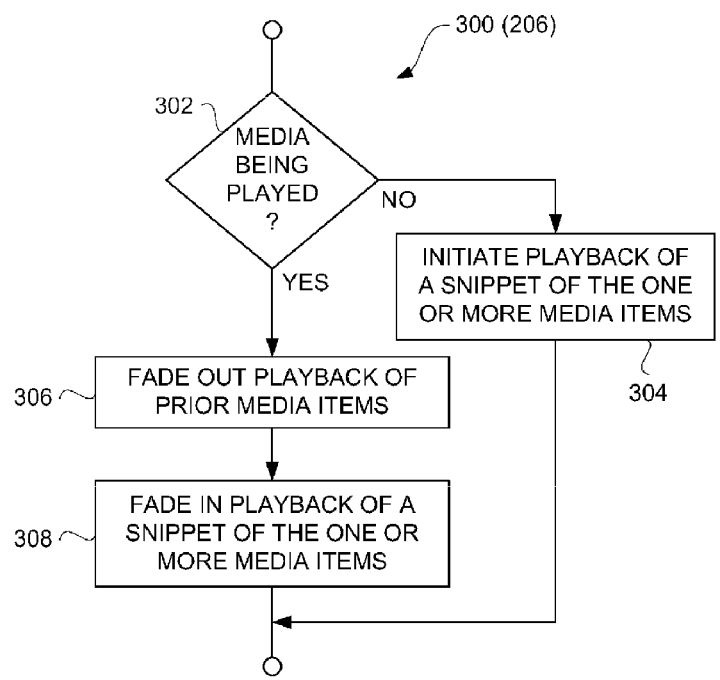
FIG. 3A illustrates a partial flow diagram of a playback initiation process according to an indictment of the invention.

FIG. 3A illustrates a partial flow diagram of a playback initiation process 300 according to one embodiment of the invention. The playback initiation process 300 can, for example, be processing performed by the block 206 illustrated in FIG. 2. The playback initiation process 300 can begin with a decision 302 that determines whether media (i.e., media item) is being played. When the decision 302 determines that media is not being play, playback of a snippet of the one or more media items can be initiated 304. On the other hand, when the decision 302 determines that media is being played, the playback initiation process 300 fades out 306 the playback of the media item currently playing, while at the same time fades in 308 the playback of a snippet of the one or more media items that the user input causes to be played. Following the blocks 304 and 308, the playback initiation process 300 can conclude.

Figure 3B:
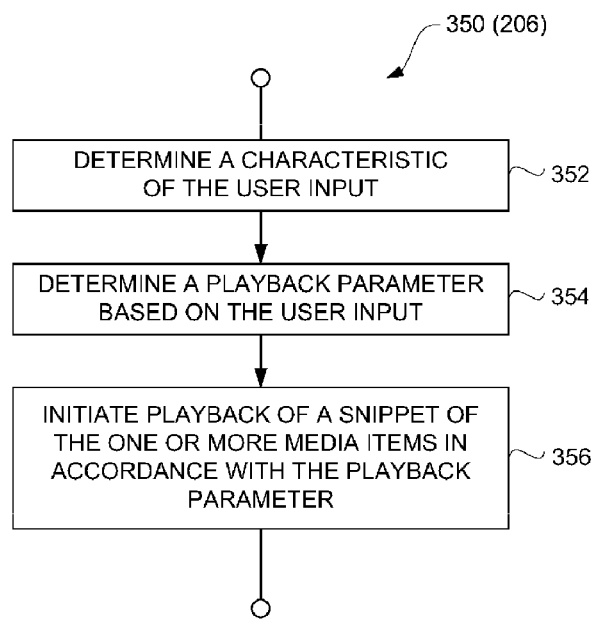
FIG. 3B illustrates a flow diagram of a playback initiation process according to another environment of the invention.

FIG. 3B illustrates a flow diagram of a playback initiation process 350 according to another environment of the invention. The playback initiation process 350 can, for example, be performed by the block 206 illustrated in FIG. 2. The playback initiation process 350 can determine 352 at least one characteristic of the user input. For example, characteristics of the user input can pertain to speed, acceleration, position, gesture, orientation and the like. A playback parameter can be determined 354 based on at least one of the characteristic of the user input. For example, the playback parameter can pertain to one or more of: playback rate, playback volume, playback tempo, and playback equalization, and the like. Thereafter, playback of a snippet of the one or more media items can be initiated 356 in accordance with the playback parameter. Following the block 356, the playback initiation process 350 can conclude.

Figure 4A:
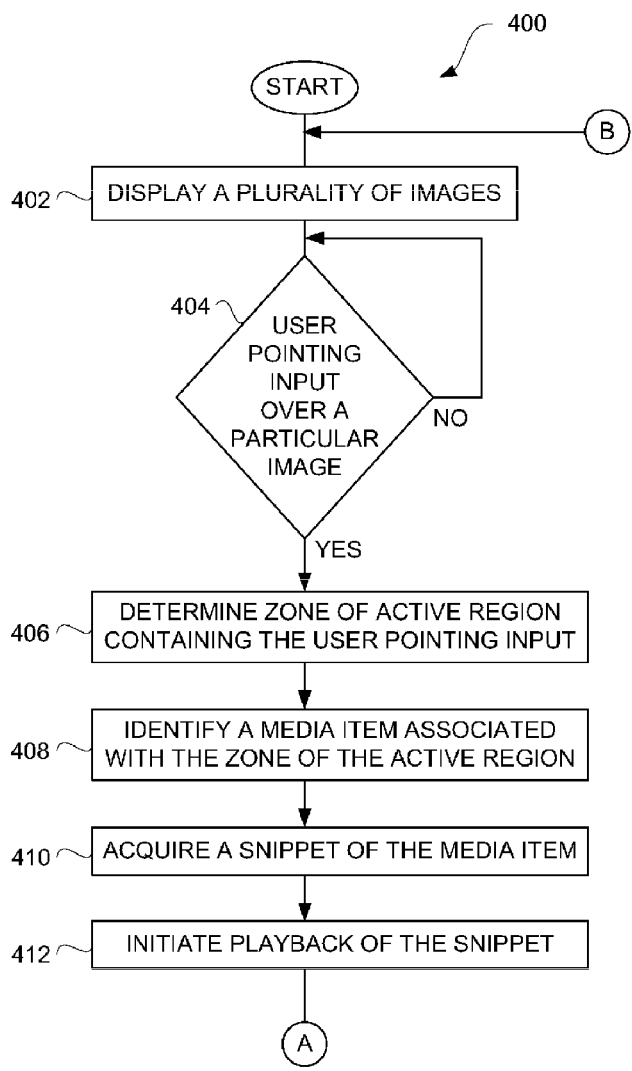
FIGS. 4A and 4B illustrate a flow diagram of a browse process according to another embodiment of the invention.
Figure 4B:
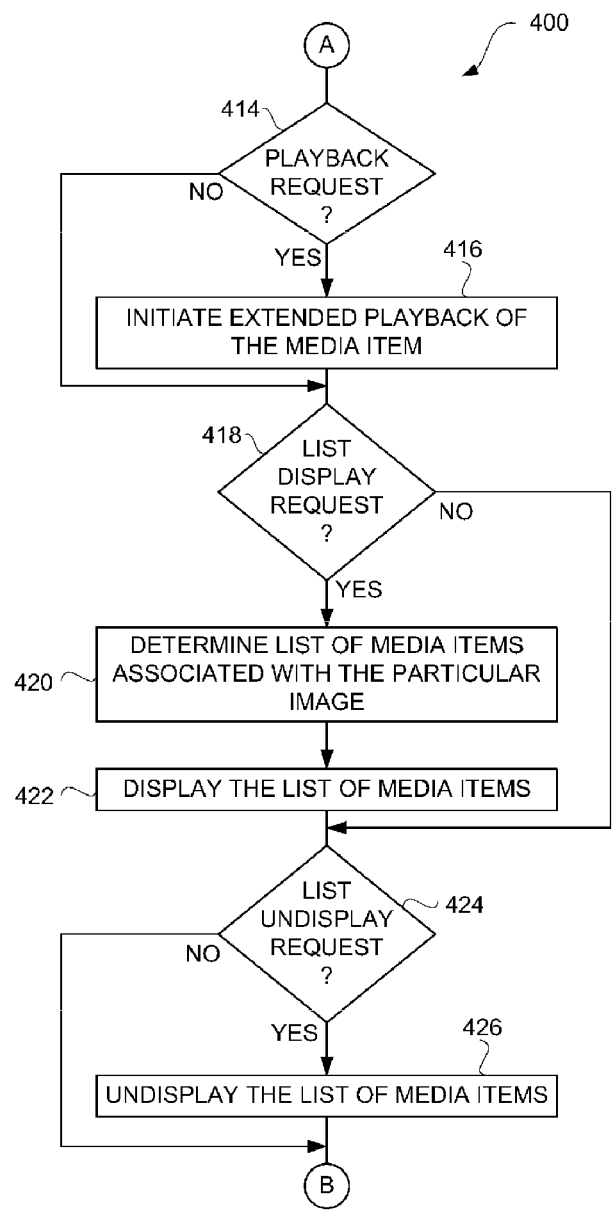

FIGS. 4A and 4B illustrate a flow diagram of a browse process 400 according to another embodiment of the invention. The browse process 400 can, for example, be performed by an electronic device having audio feedback capability. The browse process 400 can assist a user with browsing media items. The electronic device can, for example, be a computing device. For example, the electronic device can implemented by the browsing apparatus 100 illustrated in FIG. 1.

The browse process 400 can initially display 402 a plurality of images. The plurality of images are displayed 402 on a display device. In one embodiment, each of the images can pertain to a collection of the items. After the plurality of images are displayed 402, a decision 404 can determine whether a user pointing device is over any particular one of the images. When the decision 440 determines that the user pointing input is not over a particular image, the browse process 400 can await such a user pointing input. However, in some cases different types of user inputs can be processed by the electronic device while the browse process 400 is awaiting the user pointing input over a particular image.

Once the decision 404 determines that a user pointing input is over a particular image, a zone of an active region containing the user pointing input can be determined 406. The active region can be generally commensurate with the image, and the active region can be divided into one or more zones. After the zone of the active region containing the user pointing input has been determined 406, a media item associated with the zone of the active region can be identified 480. As an example, each of the images can pertain to a collection of media items, and each of the zones can correspond to one of the media items of the collection of media items. After the media item associated with the zone of the active region has been identified 408, a snippet of the media item can be acquired 410. The snippet is a short segment of the media content associated with the media item. The particular segment of the media content to which the segment corresponds may be predetermined, randomly determined or user determined. After the snippet of the media item has been acquired 410 playback of the snippet can be initiated 412.

Next, a decision 414 can determine whether a playback request has been received. A playback request being received while in the snippet is being played can be a request from the user to continue to play the media item to which the snippet corresponds. When the decision 414 determines that a playback request has been received, extended playback of the media item can be initiated 416. The extended playback of the media item can be implemented by continued playing of the media item from the end of the snippet, or can be implemented by playback of the media item from the beginning following the playback of the snippet. Alternatively, when the decision 414 determines that a playback request has not been received, the block 416 can be bypassed.

Following the block 416 or the bypassing of the block 416, a decision 418 can determine whether a list display request has been received. A list display request is a request from the user to display a list of media items associated with a particular image being displayed 402. For example, since the images being displayed 402 correspond to a collection of media items, the list can provide in the listing of those of the media items within the collection. When the decision 418 determines that a list display request has been received, a list of media items associated with the particular image can be determined 420. The list of media items can then be displayed 422. Alternatively, when the decision 418 determines that a list display request has not been received, blocks 420 and 422 can be bypassed.

Following the block 422 or the bypassing of the block 422, a decision 424 can determine whether a list undisplay request has been received. The list undisplay request operates to remove the display of the list of media items, if such a list was previously display, such as by block 422. When the decision 424 determines that a list undisplay request has been received, the list of media items can be undisplayed 426. In other words, in response to the list undisplay request, the prior display the list of media items at block 422 can be removed such that the list of media items is no longer displayed. Alternatively, when the decision 424 determines that the list undisplay request has not been received, the block 426 can be bypassed. Following the block 426, or its being bypassed, the browse process 400 can return to repeat the block 402 and subsequent blocks so that the browse process 400 can continue with respect to the same plurality of images or a different plurality of images.

The browse processing according to one or more embodiments of the invention can display a plurality of images on a display device. The images are used to facilitate the browse process. As noted above (e.g., FIG. 4A, block 402), the plurality of images can be displayed on a display screen. The plurality of images being displayed are each associated with one or more digital media assets. In one embodiment, at least one of the images is associated with a collection of digital media assets.

Figure 5A:
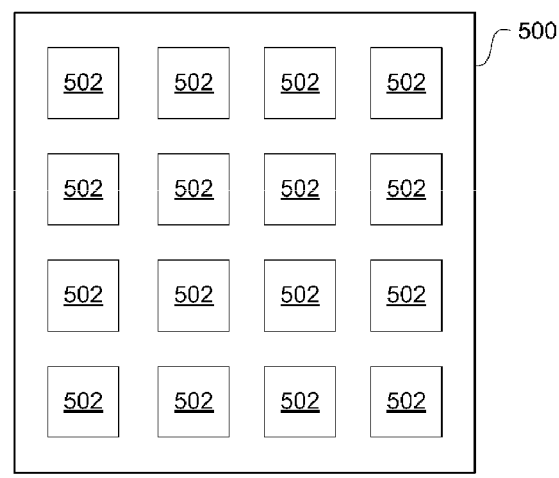
FIG. 5A illustrates a display screen depicting a plurality of images 502 according to one embodiment.

FIG. 5A illustrates a display screen 500 depicting a plurality of images 502 according to one embodiment. In FIG. 5A, the images 502 are arranged in a grid layout (e.g., 4×4 grid layout).

Figure 5B:
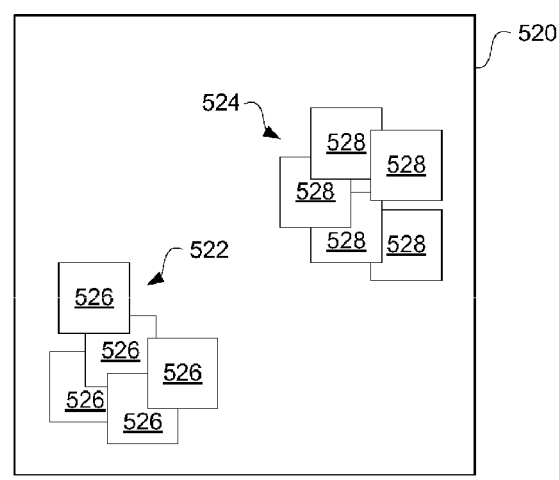
FIG. 5B illustrates a display screen depicting a plurality of images according to one embodiment.

FIG. 5B illustrates a display screen 520 depicting a plurality of images according to one embodiment. In FIG. 5B, the display screen 520 displays a first cluster 522 having partially overlapping images 526, and a second cluster 524 having partially overlapping images 528. Although the size of the images 526, 528 can be all the same size, in one embodiment, the size and/or position of the images 526, 528 within the clusters 522, 524 can be fully or partially random, or can be varied based on various criterion, such as popularity, play counts, time last played, number of digital assets represented by an image, etc.

Figure 5C:
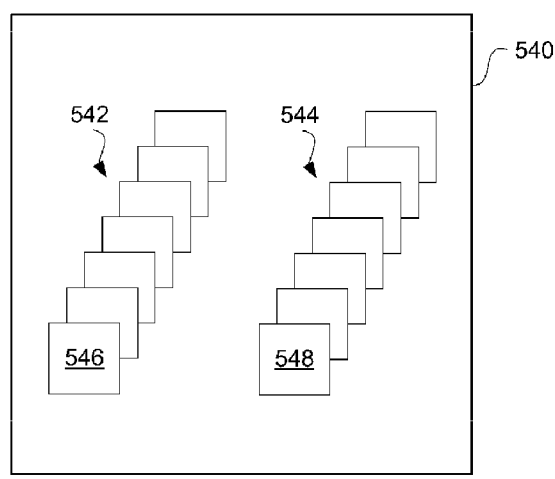
FIG. 5C illustrates a display screen depicting a plurality of images according to one embodiment.

FIG. 5C illustrates a display screen 540 depicting a plurality of images according to one embodiment. In FIG. 5C, the display screen 540 displays a first stack 542 having partially overlapping images 546, and a second stack 544 having partially overlapping images 548. Although the size of the images 546, 548 can be all the same size, in one embodiment, the size and/or position of the images 546, 548 within the stacks 542, 544 can be fully or partially random, or can be varied based on various criterion, such as popularity, play counts, time last played, number of digital assets represented by an image, etc.

Regardless of the particular arrangement of images, each of the images 502, 526, 528, 546 and 548 serves as a visual representation for one or more digital media assets. When the visual representation pertains to more than one digital media asset, the visual representation can be said to pertain to a collection (of digital media assets). For example, a collection of songs can pertain to an album, and the image 502, 526, 528, 546, 548 displayed for a given album can be the cover art for the album. As another example, a collection of songs can pertain to a user-formed mixture of digital media content, and the image 502, 526, 528, 546, 548 displayed for the collection of songs can be a mosaic formed from two or more images pertaining to songs within the collection.

Figure 6A:
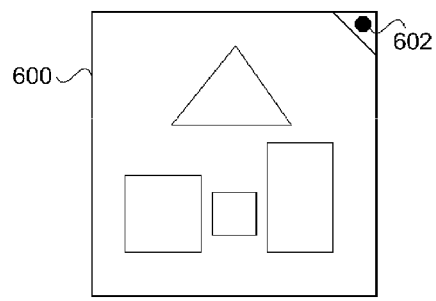
FIGS. 6A and 6B are representative display screens that can be presented according to one embodiment.
Figure 6B:
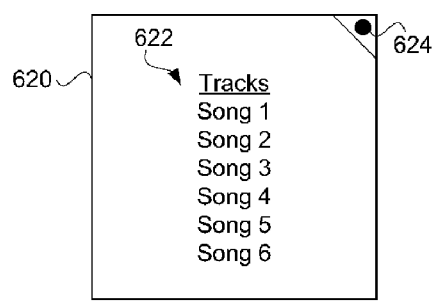

FIGS. 6A and 6B are representative display screen that can be presented according to one embodiment. FIG. 6A illustrates a display screen 600 depicting a representative image according to one embodiment. The image shown in the display screen 600 can provide a graphical representation. The image shown in the display screen 600 is also associated with one or more digital media assets. FIG. 6B illustrates a display screen 620 depicting a representative image according to one embodiment. The image shown in the display screen 620 provides a list of tracks 622 associated with the one or more digital media assets associated with the image shown in the display screen 600. As shown in FIG. 6B, the list of tracks 622 includes a collection of songs, namely, Song 1, Song 2, Song 3, Song 4, Song 5 and Song 6. In one embodiment, the display screen 600 can represent a front side of an album cover, and the display screen 620 can represent a rear side of the album cover. Additionally, the display screen 600 can include a user interface control 602 to, on selection, enable the user to switch from the display screen 600 to the display screen 620. Similarly, the display screen 620 can include a user interface control 624 to, on selection, enable the user to switch from the display screen 620 to the display screen 600. The switching between the display screens 600 and 620 can be implemented as a "flipping" action or animation.

FIGS. 7A-7D illustrates a series of representative operations with respect to a visual representation according to one embodiment of the invention. The visual representation can be displayed on a display screen associated with a computing device. The computing device also supports a pointing device, such as mouse, trackball, touch screen, touchpad, etc.

Figure 7A:
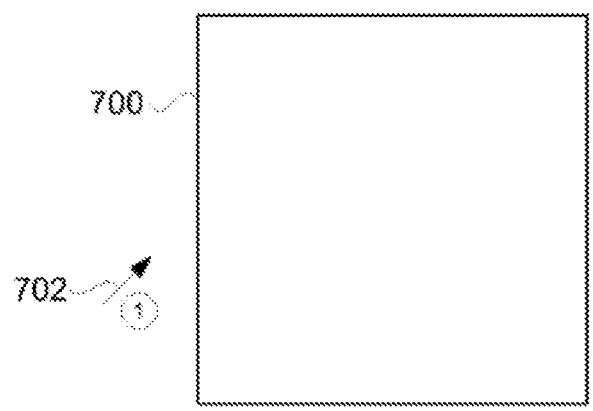
FIGS. 7A-7D illustrates a series of representative operations with respect to a visual representation according to one embodiment of the invention.

FIG. 7A illustrates an exemplary visual representation 700 according to one embodiment. The visual representation 700 is depicted in a conceptual manner and typically would include text and/or graphics. The visual representation 700 is associated with one or more digital media assets. A user pointing device can control a pointer indication 702 (e.g., cursor, touch input) that can be provided on a display screen along with the visual representation 700. As shown in FIG. 7A, the pointer indication 702 is shown in a first position (1) in which the pointer indication 702 is outside the area of the visual representation 700.

Figure 7B:
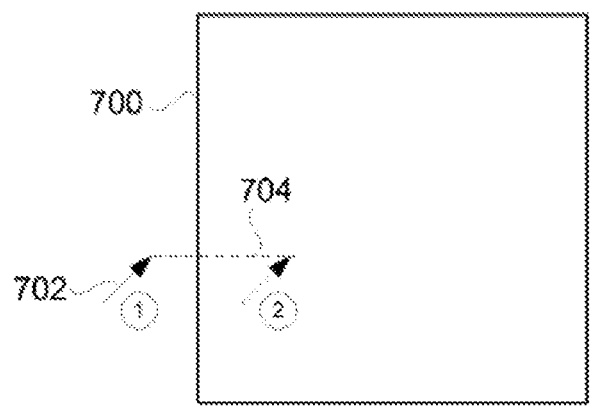

In FIG. 7B, the user causes the pointer indication 702 to translate 704 from the first position (1) to a second position (2). At the second position (2), the pointer indication 702 is over the area of the visual representation 700. As such, according to one embodiment, playback of a snippet of one of the one or more digital media assets associated with the visual representation 700 can be initiated.

Figure 7C:
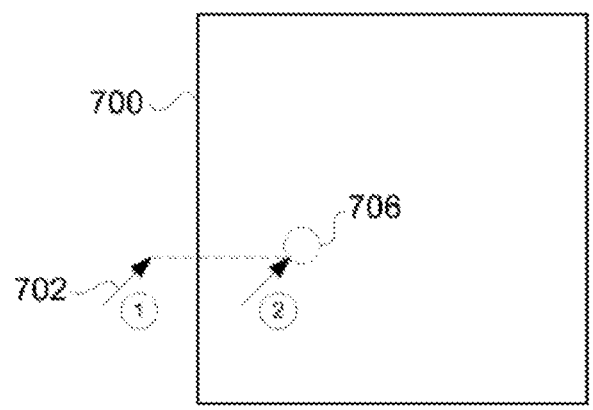

In FIG. 7C, the user causes the pointer indication 702 to hover 706 at the second position (2). In other words, the pointer indication 702 remains substantially at the second position (2). In this case, after the snippet has been played back, the playback of the one of the one or more digital media assets can continue. For example, the balance of the media content for one of the one or more digital media assets might be played (e.g., at least as long as the pointer indication 702 continues to hover 706. As another example, the media content for one of the one or more digital media assets might be played from the beginning.

Figure 7D:
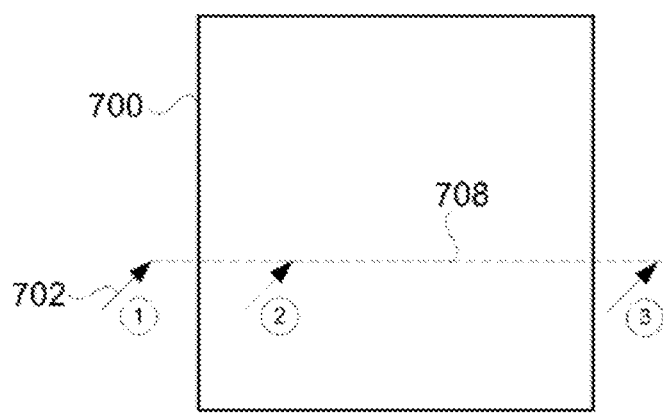

In FIG. 7D, the user causes the pointer indication 702 to translate 708 from the second position (2) to a third position (3). At the third position (3), the pointer indication 702 is outside the area of the visual representation 700. As such, according to one embodiment, playback of a snippet or other media content of one of the one or more digital media assets associated with the visual representation 700 can be concluded (immediately or after the snippet or other media content has concluded its playback).

Figure 8:
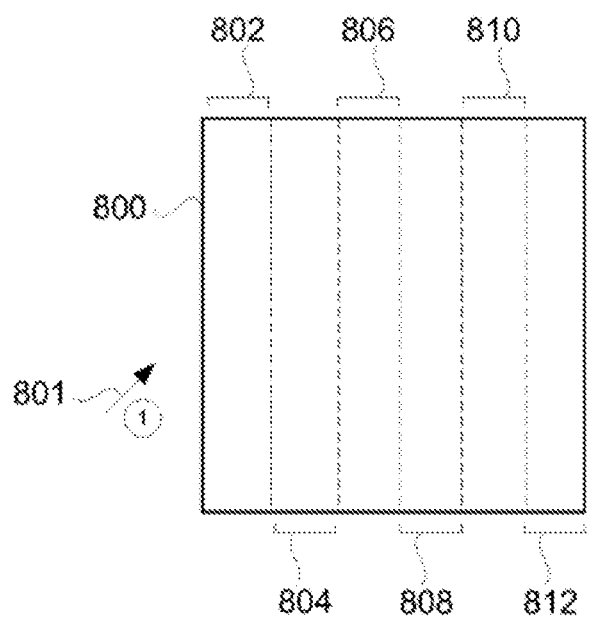
FIG. 8 illustrates a visual representation providing multiple active regions according to one embodiment.

FIG. 8 illustrates a visual representation 800 providing multiple active regions according to one embodiment. The visual representation 800 can be used as the visual representation 700 illustrated in FIGS. 7A-7D according to one embodiment. The visual representation 800 is associated with a plurality of digital media assets. Similar to the visual representation 700, the visual representation 800 can receive a user input (e.g., cursor, touch input) to provide a pointer indication 801. The visual representation 800 can be divided into a plurality of active regions 802-812 (or zones). Each of the active regions 802-812 can be associated with a different one or more of the plurality of digital media assets. As the pointer indication 801 is moved over a particular one of the active regions 802-812, a snippet corresponding to the particular one or more of the plurality of digital media assets that are associated with the particular active region 802-812 can be played back. For example, if the visual representation 800 represented six (6) digital media assets, each of the six (6) active regions 802-812 can represent a corresponding one of the six (6) digital media assets. In one embodiment, if the pointer indication 801 is moved over a particular one of the active regions 802-812 before a currently playing snippet ends, the currently playing snippet can be stopped short of completion and another snippet corresponding to the particular one of the active regions 802-812 can be initiated.

The ordering of the images associated with media assets within the groupings (e.g., clusters, stacks, grids, timelines, etc.) discussed above can be based on various attributes of metadata or other data. As few examples, ordering can be alphabetical, by date (e.g., release date), popularity (aggregated popularity data), or play count.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method, comprising:
at an electronic device with one or more processors, memory, and a display:
displaying one or more images on the display, wherein a particular image of the one or more images is associated with a plurality of active regions associated with a plurality of different media assets, wherein the plurality of active regions are not visibly distinguishable;
detecting a first user input corresponding to a first active region of the plurality of active regions, wherein the first active region corresponds to a first region of the particular image;
upon detection of the first user input, initiating playback of a media snippet of a first media asset of the plurality of media assets;
detecting a second user input corresponding to a second active region of the plurality of active regions, where the second active region is distinct from the first active region, wherein the second active region corresponds to a second region of the particular image that is different from the first region of the particular image; and
upon detection of the second user input, initiating playback of a media snippet of a second media asset of the plurality of media assets.

2. The method of claim 1, wherein initiating playback of the media snippet of the second media asset of the plurality of media assets includes:
fading out the playback of the media snippet of the first media asset of the plurality of media assets; and
at the same time, fading in the playback of the media snippet of the second media asset of the plurality of media assets.

3. The method of claim 1, further comprising:
receiving a list display request to display a list of media items associated with the plurality of media assets; and in response to the list display request, displaying the list of media items corresponding to the plurality of media assets.

4. The method of claim 1, wherein the plurality of media assets belong to an album, and the particular image is cover art for the album.

5. The method of claim 1, wherein the plurality of media assets are user-formed mixture of digital media content, and the particular image is a mosaic formed from two or more images associated with the plurality of media assets.

6. The method of claim 1, wherein upon detection of the second user input, stopping short of completion of the playback of the first media asset and initiating playback of the media snippet of the second media asset of the plurality of media assets.

7. The method of claim 1, further comprising:
while the media snippet of the second media asset is being played, detecting a user hovering input at the second active region for more than a predetermined time period; and
in response to detecting the user hovering input, initiating extended playback of the second media asset.

8. An electronic device, comprising:
a display;
one or more processors;
memory; and
one or more programs, wherein the one or more programs are stored in the memory and configured to be executed by the one or more processors, the one or more programs including instructions for:
displaying one or more images on the display, wherein a particular image of the one or more images is associated with a plurality of active regions associated with a plurality of different media assets, wherein the plurality of active regions are not visibly distinguishable;
detecting a first user input corresponding to a first active region of the plurality of active regions, wherein the first active region corresponds to a first region of the particular image;
upon detection of the first user input, initiating playback of a media snippet of a first media asset of the plurality of media assets;
detecting a second user input corresponding to a second active region of the plurality of active regions, where the second active region is distinct from the first active region, wherein the second active region corresponds to a second region of the particular image that is different from the first region of the particular image; and
upon detection of the second user input, initiating playback of a media snippet of a second media asset of the plurality of media assets.

9. The electronic device of claim 8, wherein initiating playback of the media snippet of the second media asset of the plurality of media assets includes:
fading out the playback of the media snippet of the first media asset of the plurality of media assets; and
at the same time, fading in the play back of the media snippet of the second media asset of the plurality of media assets.

10. The electronic device of claim 8, wherein the one or more programs further include instructions for:
receiving a list display request to display a list of media items associated with the plurality of media assets; and
in response to the list display request, displaying the list of media items corresponding to the plurality of media assets.

11. The electronic device of claim 8, wherein the plurality of media assets belong to an album, and the particular image is cover art for the album.

12. The electronic device of claim 8, wherein the plurality of media assets are user-formed mixture of digital media content, and the first image is a mosaic formed from two or more images associated with the plurality of media assets.

13. The electronic device of claim 8, wherein upon detection of the second user input, stopping short of completion of the playback of the first media asset and initiating playback of the media snippet of the second media asset of the plurality of media assets.

14. The electronic device of claim 8, wherein the one or more programs further include instructions for:
while the media snippet of the second media asset is being played, detecting a user hovering input at the second active region for more than a predetermined time period; and
in response to detecting the user hovering input, initiating extended playback of the second media asset.

15. A non-transitory computer readable storage medium storing one or more programs, the one or more programs comprising instructions, which when executed by an electronic device with a display, cause the device to:
display one or more images on the display, wherein a particular image of the one or more images is associated with a plurality of active regions associated with a plurality of different media assets, wherein the plurality of active regions is not visibly distinguishable;
detect a first user input at corresponding to a first active region of the plurality of active regions, wherein the first active region corresponds to a first region of the particular image;
upon detection of the first user input, initiate playback of a media snippet of a first media asset of the plurality of media assets;
detect a second user input at corresponding to a second active region of the plurality of active regions, where the second active region is distinct from the first active region, wherein the second active region corresponds to a second region of the particular image that is different from the first region of the particular image; and
upon detection of the second user input, initiate playback of a media snippet of a second media asset of the plurality of media assets.

16. The computer readable storage medium of claim 15, wherein initiating playback of the media snippet of the second media asset of the plurality of media assets includes:
fading out the playback of the media snippet of the first media asset of the plurality of media assets; and
at the same time, fading in the play back of the media snippet of the second media asset of the plurality of media assets.

17. The computer readable storage medium of claim 15, further comprising instructions to:
receive a list display request to display a list of media items associated with the plurality of media assets; and
in response to the list display request, display the list of media items corresponding to the plurality of media assets.

18. The computer readable storage medium of claim 15, wherein the plurality of media assets belong to an album, and the particular image is cover art for the album.

19. The computer readable storage medium of claim 15, wherein the plurality of media assets are user-formed mixture of digital media content, and the first image is a mosaic formed from two or more images associated with the plurality of media assets.

20. The computer readable storage medium of claim 15, wherein upon detection of the second user input, stopping short of completion of the playback of the first media asset and initiating playback of the media snippet of the second media asset of the plurality of media assets.

21. The computer readable storage medium of claim 15, further comprising instructions to:
    while the media snippet of the second media asset is being played, detect a user hovering input at the second active region for more than a predetermined time period; and
    in response to detecting the user hovering input, initiate extended playback of the second media asset.

* * * * *